United States Patent
Cherepinsky

(10) Patent No.: US 8,231,085 B2
(45) Date of Patent: Jul. 31, 2012

(54) AUTOMATIC TRIM SYSTEM FOR FLY-BY-WIRE AIRCRAFT WITH UNIQUE TRIM CONTROLLERS

(75) Inventor: Igor Cherepinsky, Sandy Hook, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 298 days.

(21) Appl. No.: 12/756,997

(22) Filed: Apr. 8, 2010

(65) Prior Publication Data
US 2011/0168851 A1 Jul. 14, 2011

Related U.S. Application Data

(60) Provisional application No. 61/185,225, filed on Jun. 9, 2009.

(51) Int. Cl.
*B64C 13/04* (2006.01)
(52) U.S. Cl. .................... 244/223; 244/234; 244/236
(58) Field of Classification Search .............. 244/220, 244/221, 223, 228, 230, 234, 236
See application file for complete search history.

(56) References Cited

U.S. PATENT DOCUMENTS

| | | | |
|---|---|---|---|
| 4,077,589 A | 3/1978 | Belolipetsky et al. | |
| 4,330,829 A | 5/1982 | Fischer et al. | |
| 4,373,184 A | 2/1983 | Lambregts | |
| 4,378,518 A | 3/1983 | Nixon | |
| 4,385,356 A | 5/1983 | Verzella et al. | |
| 4,420,808 A | 12/1983 | Diamond et al. | |
| 4,507,742 A | 3/1985 | Bateman | |
| 4,714,929 A | 12/1987 | Davidson | |
| 4,769,759 A | 9/1988 | McGough | |
| 4,786,014 A | 11/1988 | Pesando et al. | |
| 4,869,444 A | 9/1989 | Ralph | |
| 4,953,098 A | 8/1990 | Fischer, Jr. et al. | |
| 4,965,879 A | 10/1990 | Fischer, Jr. | |
| 4,980,684 A | 12/1990 | Paterson et al. | |
| 5,008,825 A | 4/1991 | Nadkarni et al. | |
| 5,113,346 A | 5/1992 | Orgun et al. | |
| 5,141,177 A | 8/1992 | Wright et al. | |
| 5,209,431 A | 5/1993 | Bernard et al. | |
| 5,301,112 A | 4/1994 | Gold et al. | |
| 5,446,666 A | 8/1995 | Bauer | |
| 5,617,316 A | 4/1997 | Fogler, Jr. et al. | |
| 5,676,334 A | 10/1997 | Cotton et al. | |
| 5,823,479 A | 10/1998 | Nield et al. | |
| 5,826,833 A | 10/1998 | Evans et al. | |
| 5,904,724 A | 5/1999 | Margolin | |
| 6,076,024 A | 6/2000 | Thornberg et al. | |
| 6,092,007 A | 7/2000 | Cotton et al. | |
| 6,189,836 B1 | 2/2001 | Gold et al. | |
| 6,236,914 B1 | 5/2001 | Kaloust | |
| 6,246,929 B1 | 6/2001 | Kaloust | |
| 6,292,720 B1 | 9/2001 | Schulz et al. | |
| 6,314,343 B1 | 11/2001 | Adams et al. | |

(Continued)

*Primary Examiner* — Tien Dinh
*Assistant Examiner* — Nicholas McFall
(74) *Attorney, Agent, or Firm* — Carlson, Gaskey & Olds, P.C.

(57) ABSTRACT

A flight control system includes a controller which defines a controller displacement and a control surface which defines a control surface authority. A module operable to provide a displacement feel to the controller in response to a remaining portion of the controller displacement being greater than a remaining portion of the control surface authority and the module operable to re-reference a center of the controller displacement to equate the remaining portion of the controller displacement with the remaining portion of the control surface authority in response to the remaining portion of the controller displacement being less than the remaining portion of the control surface authority.

17 Claims, 6 Drawing Sheets

U.S. PATENT DOCUMENTS

| | | |
|---|---|---|
| 6,539,290 B1 | 3/2003 | Vos |
| 6,622,065 B2 | 9/2003 | Mezan |
| 6,629,023 B1 | 9/2003 | Silder, Jr. |
| 6,648,269 B2 | 11/2003 | Gold et al. |
| 6,859,689 B2 | 2/2005 | Vos |
| 6,938,472 B2 | 9/2005 | Kaushik et al. |
| 7,195,200 B2 | 3/2007 | Yamane |
| 7,305,285 B2 | 12/2007 | Villaume et al. |
| 7,433,765 B2 | 10/2008 | Fanciullo et al. |

AUTOMATIC TRIM SYSTEM FOR FLY-BY-WIRE AIRCRAFT WITH UNIQUE TRIM CONTROLLERS

REFERENCE TO RELATED APPLICATIONS

This application claims priority to U.S. Provisional Patent Application No. 61/185,225, filed Jun. 9, 2009.

STATEMENT REGARDING FEDERALLY SPONSORED RESEARCH OR DEVELOPMENT

This disclosure was made with Government support under W58RGZ-06-D-0045 awarded by The United States Army. The Government has certain rights in this invention.

BACKGROUND

The present disclosure relates to a flight control system, and more particularly to a flight control system auto-trim logic which facilities use of unique trim controllers.

A rotary-wing aircraft flight control system typically employs a displacement controller, such as a center cyclic stick, whose position provides an indication to the pilot of the angular disposition or attitude of the rotor. With a displacement controller, there is full correlation between the position of the controller and control surface command. Emergent generations of fly-by-wire (FBW) aircraft such as rotary-wing aircraft provide high levels of augmentation. The pilot-vehicle interface within a rotary-wing aircraft environment often utilize "unique trim" controllers. A unique-trim controller does not produce a fixed amount of output for a given pilot input; instead the unique-trim controller integrates the input over time and produces an output that is a combination of the controller displacement and the controller displacement time period. The direct correlation between controller position and control surface command that is present with a displacement controller is absent with a unique-trim controller.

The unique-trim controllers always return to a null or center position when the aircrew does not apply a force to the controller. This operates effectively in a fully augmented mode, where displacement from center commands a particular action, i.e. an attitude or a velocity change, and return to the center position commands a hold function, i.e. attitude or velocity hold.

One disadvantage of unique trim controllers may become apparent during aircraft state sensor failure. During such failures it is no longer possible to provide the full level of augmentation and the flight control system reverts to some combination of rate feedback within a direct rotor control mode. In the direct rotor control mode, unique trim may complicate flight control since the actual trim (equilibrium) point of the aircraft varies with aircraft states such as airspeed, gross weight, etc. This may result in the aircrew having to hold the controller stick against a centering force.

To alleviate this, prior FBW rotary-wing aircraft implemented a trim "follow-up" logic. Follow-up logic feeds selected—usually relatively low—frequency inputs from the controllers to integrators in each axis to slowly translate the flight control position toward the controller position. In this scheme, the aircrew will eventually return the controller to the center, while the flight control will remain in the new trimmed state. This operates well for pitch cyclic and for roll cyclic.

For yaw pedals, however, unique trim control with trim follow-up may result in an "unnatural" feel. In a direct mode, sometimes known as stick-to-head mode, the aircrew rolls the aircraft into a turn and applies pedal until a coordinated turn is established. With trim follow-up, the aircrew is forced to slowly reduce yaw pedal input during the coordinated turn since trim follow-up is always moving the tail rotor pitch towards the applied yaw pedal. This may increase workload during coordinated turns in the direct mode.

SUMMARY

A flight control system according to an exemplary aspect of the present disclosure includes a controller which defines a controller displacement and a control surface which defines a control surface authority. A module operable to provide a displacement feel to the controller in response to a remaining portion of the controller displacement being greater than a remaining portion of the control surface authority and the module operable to re-reference a center of the controller displacement to equate the remaining portion of the controller displacement with the remaining portion of the control surface authority in response to the remaining portion of the controller displacement being less than the remaining portion of the control surface authority.

A method of flight control according to an exemplary aspect of the present disclosure includes providing a displacement feel to the controller in response to a remaining portion of the controller displacement being greater than a remaining portion of the control surface authority. Re-referencing a center of the controller displacement to equate the remaining portion of the controller displacement with the remaining portion of the control surface authority in response to the remaining portion of the controller displacement being less than the remaining portion of the control surface authority.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
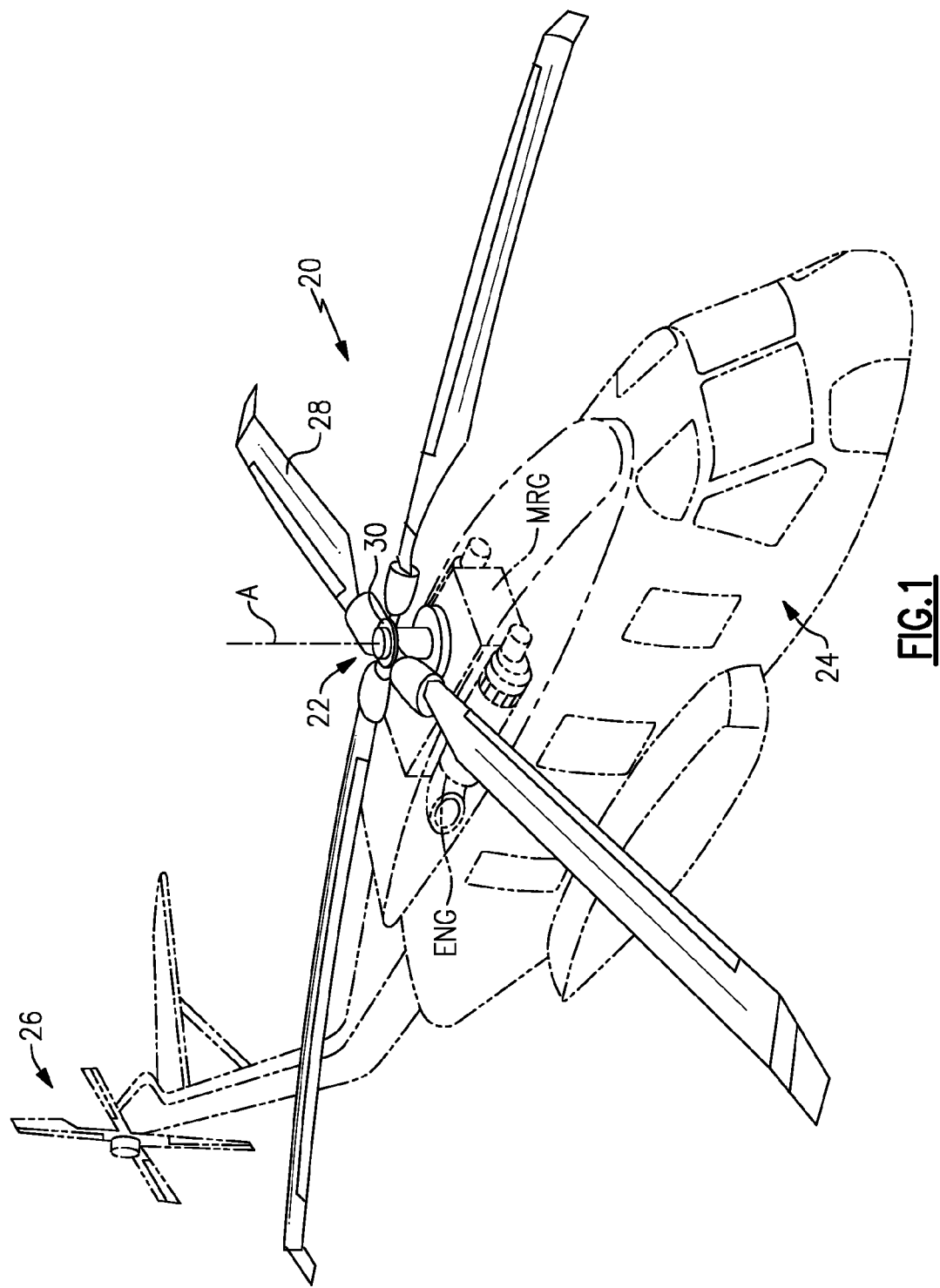
FIG. 1 is a perspective view of one exemplary rotary wing aircraft.

FIG. 1 schematically illustrates an exemplary vertical take-off and landing (VTOL) rotary-wing aircraft 20. The aircraft 20 in the disclosed, non-limiting embodiment includes a main rotor system 22 supported by an airframe 24 having an extending tail which mounts an anti-torque system 26 such as a tail rotor system. The main rotor system 22 is driven about an axis of rotation A through a main rotor gearbox MRG by one or more engines ENG. The main rotor gearbox MRG may be interposed between the one or more engines ENG, the main rotor system 22 and the anti-torque system 26. The main rotor gearbox MRG is mechanically connected to the main rotor system 22 and to the anti-torque system 26 so that the main rotor system 22 and the anti-torque system 26 may both driven by the main rotor gearbox MRG. The main rotor system 22 includes a multiple of rotor blades 28 mounted to a rotor hub 30. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
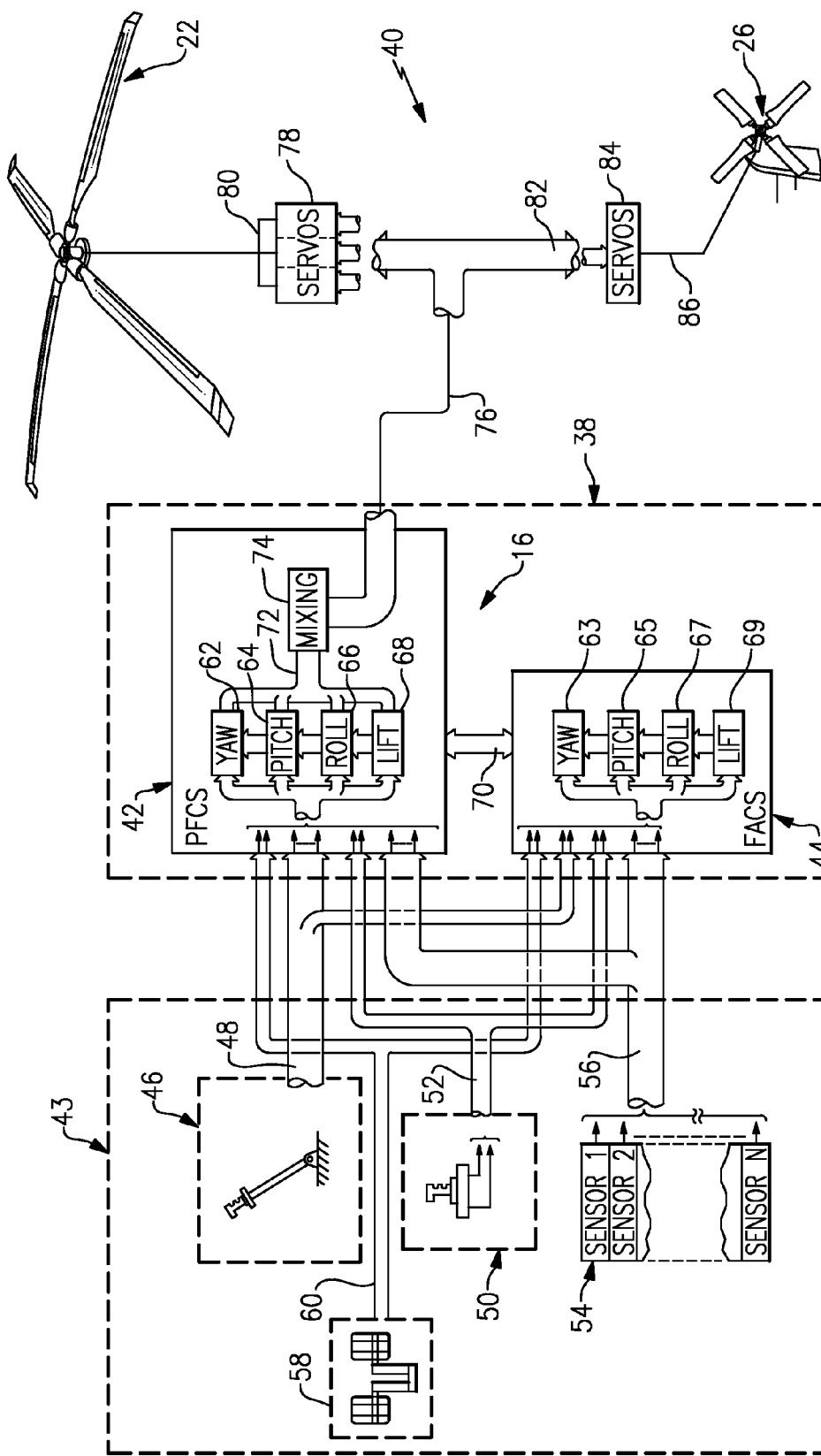
FIG. 2A is a block diagram of a non-limiting embodiment of an exemplary model following flight control system.

Referring to FIG. 2A, a fly-by-wire type flight control system 40 includes a model following control which shapes controller displacement commands through an inverse vehicle model to produce the desired aircraft response. The flight control system 40 processes the controller inputs and sensor data and transmits the resultant signals to the aircraft 20 primary servos via electrical/fiber optic paths. The processing is typically digital, but may be analog. The flight control system 40 may, in one non-limiting embodiment, include a Flight Control Computer (FCC) 38 which provides control laws operable to combine aircrew commands with other system commands, for example an external or separately partitioned set of control laws that provide manual and/or automatic mission specific flight logic modes, and sensor data to generate servo commands to control the aircraft 20. The FCC 38 implements a control law structure that embodies a desired aircraft response model and the control paths to drive the aircraft to follow that response The FCC 38 generally includes a Primary Flight Control System (PFCS) 42 and an Automatic Flight Augmentation and Cuing System (FACS) 44. The PFCS 42, as a minimum, is the flight critical portion of the flight control system 40. The PFCS 42 may also provide stability and control augmentation and additional mission-critical/aiding control laws to enhance the handling qualities of the aircraft. The FACS 44 provides mission facilitating control laws. The FACS 44 is typically implemented in a separate software partition or processor from the PFCS 42.

The PFCS 42 and FACS 44 receive input command signals from a collective controller 46 on line 48, a cyclic controller 50 on line 52, and the aircraft's sensed parameter signals from sensor suite 54, on lines 56 and a yaw pedal controller 58 on lines 60. Cockpit controllers located in the cockpit of the aircraft 20 are operated manually by the aircrew and may take various forms including, but not limited to, collective stick systems, sidearm controller systems, yaw pedal systems or other such controllers which may alternatively be located within the aircraft itself and may alternatively or additionally be remotely located to control an unmanned or manned aircraft system. The collective controller 46, the cyclic controller 50, the aircraft's sensed parameter signals from sensor suite 54 and the yaw pedal controller 58 may be jointly referred to as an Input Signal Management (ISM) system 43. It should be understood that other systems may alternatively or additionally be provided within the ISM system 43.

The PFCS 42 and FACS 44 may each contain separate flight control law models for controlling the yaw, pitch, roll and lift axes of the aircraft. The models are included in the PFCS 42 and FACS 44 (schematically represented by modules 62, 64, 66, 68 for the PFCS 42 and modules 63, 65, 67, 69 for the FACS 44). The sensed parameter signals from aircraft sensors suite 54, provide the PFCS 42 and FACS 44 with the aircraft's angular rate and attitude response to the rotor command signals. The PFCS 42 is operable to execute an explicit model-following algorithm to provide a rate command/attitude hold (RC/AH) response in the pitch, roll and yaw axes.

The PFCS 42 provides rotor command signals and the FACS 44 provides conditioning of the PFCS 42 four axis logic functions to facilitate, for example only, autopilot capabilities.

The PFCS 42 and FACS 44 modules are interconnected through bus 70 to provide rotor command signals on output lines 72 to a mixing function 74 which communicates commands on lines 76 for the displacement of the main rotor servo system 78 and linkages 80 to control the tip path plane of the main rotor system 22.

A mixed command signal is also provided on line 82 to the tail rotor servo system 84 to control the thrust of the anti-torque system 26 through linkages 86. In a rotary-wing aircraft, the servo system produces changes in hydraulic, electrical or mechanical actuation systems that alter the flight control surfaces such as main rotor collective pitch, lateral cyclic pitch, longitudinal cyclic pitch, and tail rotor pitch. In a fixed wing aircraft, the servo system produces changes in hydraulic, electrical or mechanical actuation system the actuators manipulate flight control surfaces such as a rudder, elevators, and ailerons.

Figure 2B:
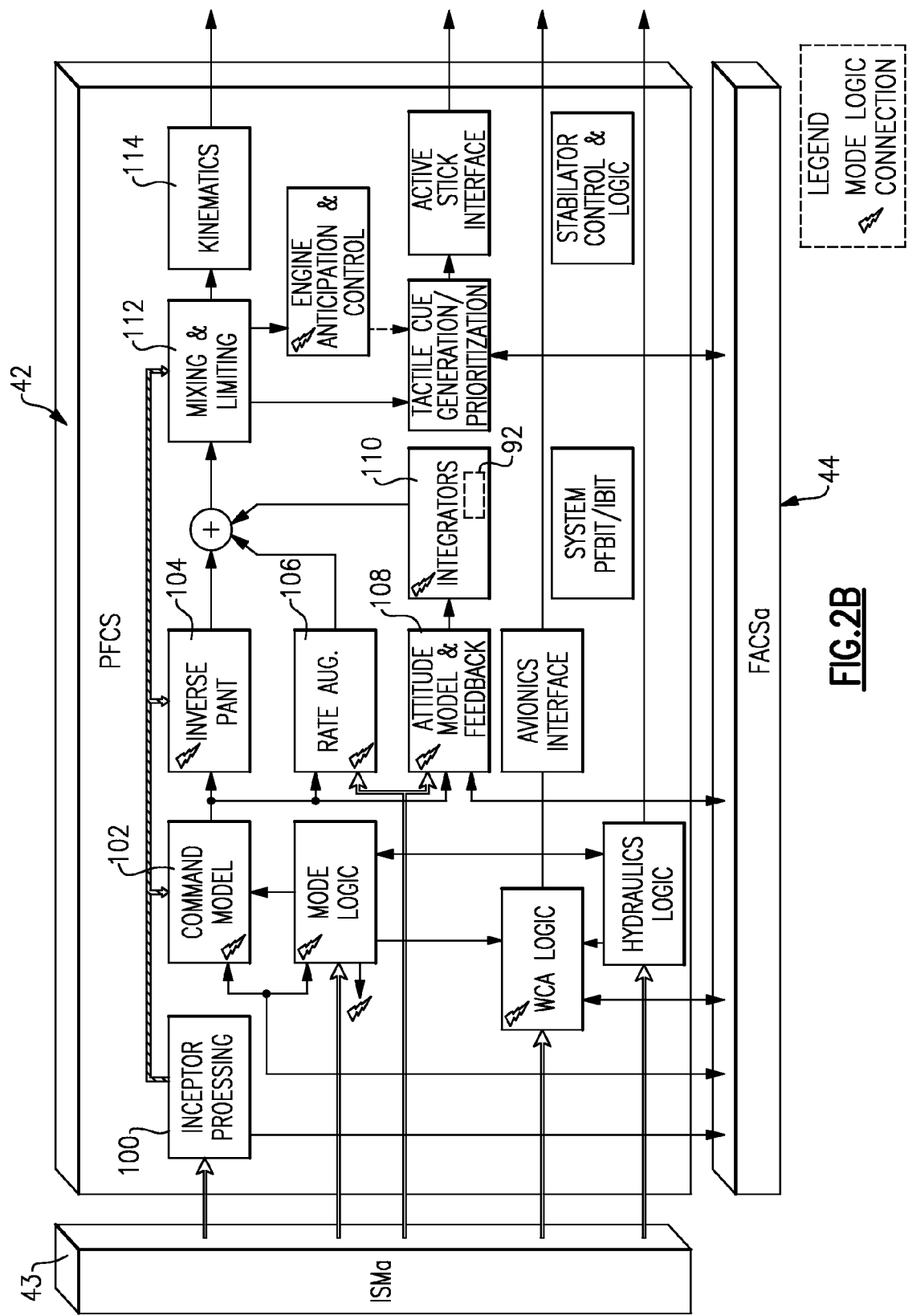
FIG. 2B is a block diagram of the integration of a fly-by-wire flight control system.

Referring to FIG. 2B, the fly-by-wire type flight control system 40 is disclosed in terms of functional module diagrams, and it should be understood by those skilled in the art with the benefit of this disclosure that these functions may be enacted in either dedicated hardware circuitry or programmed software routines capable of execution in a microprocessor based electronics control embodiment. Although a multitude of functional modules are illustrated which are typical of a PFCS 42, only the functional modules directly related to the disclosure will be discussed in detail herein. It should be understood that various flight control systems will benefit herefrom.

The PFCS 42 and FACS 44 execute explicit model following control laws to provide both control and stability augmentation. In model following control law architecture, aircrew commands are shaped directly into desired aircraft responses. These desired commands are then passed through an inverse aircraft model to obtain the flight control surface commands required to produce the desired response. The difference between the desired command and the aircraft response is also fed back to drive these errors towards zero, to improve the model following performance.

The ISM system 43 communicates with the PFCS 42 such that an Inceptor Processing logic module 100 manages pilot and copilot inputs from, for example, the collective controller 46, the cyclic controller 50, the aircraft's sensed parameter signals from the sensor suite 54 and the yaw pedal controller 58. The Inceptor Processing logic module 100 combines the controller inputs to produce a total command to the fly-by-wire type flight control system 40.

Once the total command is produced, a Command Model module 102 shapes the total command into a desired response type. The Command Model module 102 contains a basic rate command response type. All other response types are implemented in the FACS module 44 and under normal conditions passed to the Command Model module 102.

Mode logic, as defined herein, involves the coordination of "behaviors" among a collection of devices or functions such as those illustrated by the logic modules. Mode logic provides system-level modes which may involve coordinated actions. Each of the logic modules within the FCS 40 is individually complex such that combined operations thereof are controlled through mode logic. Loss of sensor information due to failures or battle damage is monitored by the FCS 40 and is used to reconfigure the control laws and response characteristics of the logic modules as necessary based on the mode logic to switch between, for example, a fully augmented mode and a direct mode.

An Inverse Aircraft Model logic module 104 utilizes the desired angular rate as an input to produce plant cancellation commands that will result in the aircraft achieving the desired angular rate. The Inverse Aircraft Model logic module 104 is under control of the mode logic to change behavior to support the fully augmented mode during conventional flight operations and the direct mode.

A Rate Augmentation logic module 104 receives the desired angular rates and applies rate feedback to drive the Inverse Plant logic module 104 realization of the desired angular rates. The Rate Augmentation logic module 106 may also be controlled by the mode logic such that, for example, the Rate Augmentation logic module 106 output may be disabled in case of a rate sensor failure or detection that the aircraft is on the ground through a weight on wheels sensor.

An Attitude Model and Feedback logic module 108 receives the desired angular rates and applies Euler transforms to the desired angular rates to compute desired attitude rates. The desired attitude rates are integrated in an Integrator logic module 110 to compute the desired aircraft attitudes. After the desired attitudes have been computed, attitude feedback is applied to drive the Inverse Aircraft Mode logic module 104 and Attitude Model and Feedback logic module 108 to obtain the desired rates/attitudes.

The Integrator logic module 110 receives attitude errors and applies integral feedback to reduce the steady state error. The Integrator logic module 110 is under mode logic control and can be reconfigured to provide an auto-trim function in the direct mode. The auto-trim function is activated in response to activation of the direct mode in which the pitch and roll axes are provided with conventional trim-follow-up functionality and the yaw axis is provided with the auto-trim functionality through an auto-trim logic 92 as disclosed herein. Although disclosed in the non-limiting embodiment for use with the yaw pedal controller 58 and the anti-torque system 26, the auto-trim logic 92 is applicable to other axes on various aircraft to include but not to be limited to rotary-wing and fixed-wing aircraft.

A Mixing logic module 112 and a Kinematics logic module 114 thus receive flight control commands from the above-discussed logic modules to compute the required servo command for the servo systems 78, 84 to achieve the required flight control position. In this non-limiting embodiment, the pitch and roll axes are controlled by the main rotor system 22 with conventional trim-follow-up functionality in the direct mode, while the yaw axis in this non-limiting embodiment is controlled by the anti-torque system 26 with the auto-trim logic 92 in the direct mode. Other flight controls may alternatively or additionally be controlled with the disclosed auto-trim logic 92.

Selection of the appropriate response type and appropriate feedback is a function of a Mode Control Logic (FIG. 2B) contained in the PFCS 42 and Mode Control Logic contained in the FACS 44 (FIG. 2B). Mode Control logic in the PFCS 42 is responsible for system reconfiguration in the event of hardware failures within, for example, the FCC 38 and the sensor suite 54. Particular combinations of failures within the sensor suite 54 that may occur as a result of sensor loss which determine, for example, Angular Rates, Attitudes, Airspeed and combinations thereof such that the appropriate response type and appropriate feedback are selected through the Mode Control Logic. One example of the mode control logic selection is from a "fully augmented mode" to a "direct mode". The probability that any of these failure states would be encountered in-flight is a function of system/sensor redundancy/reliability and battle damage tolerance.

In response to certain combinations of failures, the Mode Control Logic will switch the system into "direct mode", in this mode, the ISM system 43 controls blade pitch directly and a limited authority rate feedback from the sensor suite 54 is used to provide rate damping. Auto-trim is also active in this mode. All other mode selections are controlled by mode logic in FACS 44

Figure 2C:
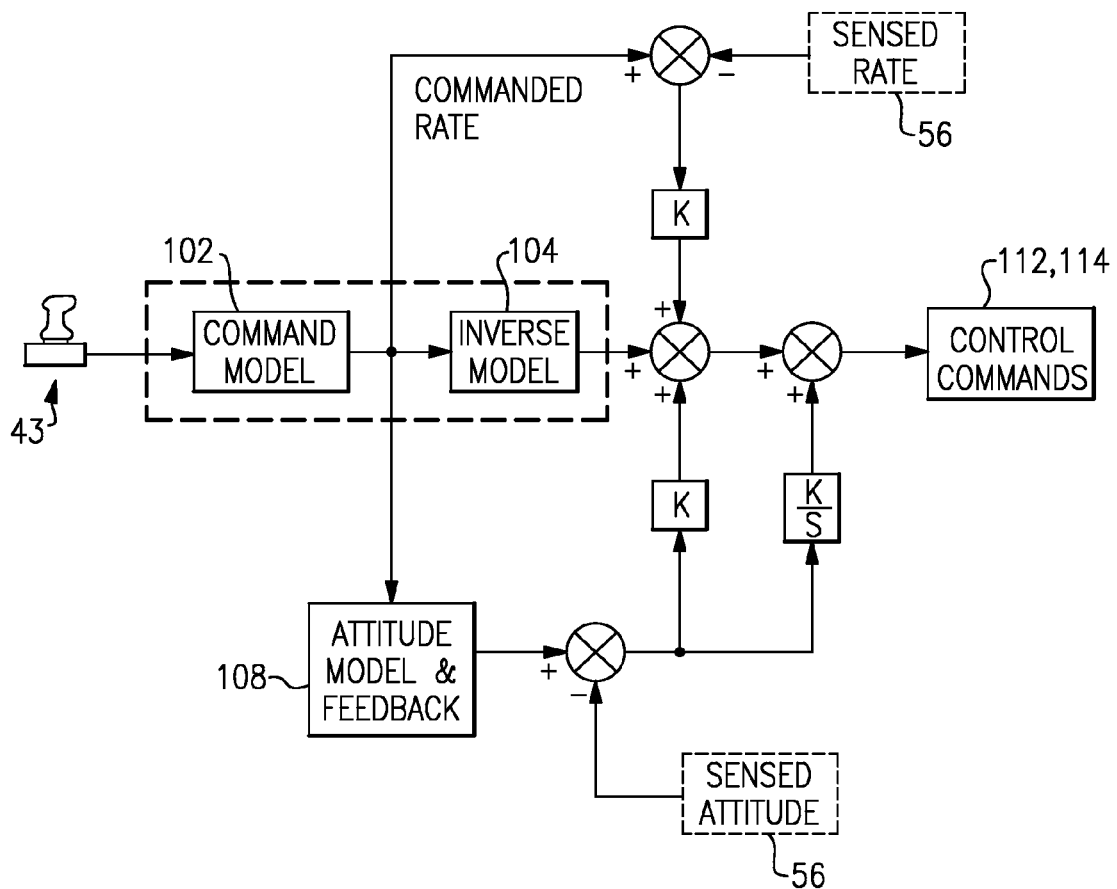
FIG. 2C is a block diagram of a Model-Following Control Laws Structure for the fly-by-wire flight control system.

Referring to FIG. 2C, the command model module 102 is a generic architecture that generally includes a second order lead-lag filter function in pitch and roll with variable parameters that control the gain and bandwidth characteristics of the command model module 102. The yaw axis model is first-order with variable parameters. The command model module 102 may also include acceleration limits to smooth aircrew inputs and limit main rotor system 22 and anti-torque system 26 moments. The command model module 102 outputs are commanded body-axis rates.

For normal operation, the command model module 102 is reduced to a lag filter via pole/zero cancellation to provide a first-order rate command response in pitch and roll. If the ISM 43 is significantly degraded by failures or battle damage or for on-ground/water operation, the rate and attitude paths are disabled and the command model module 102 is re-parameterized to provide control quickening and a direct link to the main rotor system 12. When a more stabilized control response is desired, the pitch and roll models (FIG. 2A) can be re-parameterized to produce a second-order, attitude command response.

The inverse aircraft model logic module 104 uses a simplified model of the aircraft dynamics to calculate feed-forward plant canceller commands that are consistent with the command model module 102 outputs. The commanded rate is compared to the actual rate and the error is multiplied by a feedback gain. The commanded rate is also integrated to produce a commanded attitude, compared to the sensed attitude, and fed back to provide unique-trim control. Since both the rate and attitude feedbacks operate on the errors between the aircrew commands and the aircraft response, these control paths improve model-following performance and do not fight the aircrew commands. When the aircraft is not maneuvering, i.e. stick in detent, the attitude error is also integrated and fed back to hold attitude.

Figure 3:
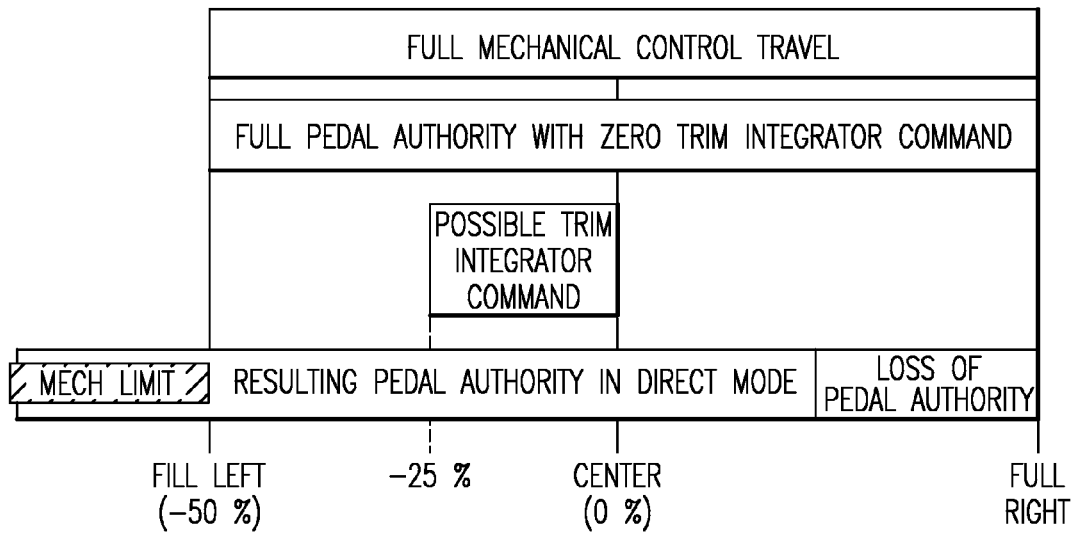
FIG. 3 is a schematic reference of Full Mechanical Control Travel as compared to Full controller Authority with Zero Trim Integrator Command.

If attitude information is not available, the attitude feedback can be replaced with lagged rate feedback. This provides sufficient handling qualities for continued safe flight under all but the most extreme mission conditions. Referring to FIG. 3, in direct mode, use of "unique trim" controllers may be undesirable since, the actual trim (equilibrium) point of the aircraft varies with airspeed, gross weight, ground state etc., such that some trim follow-up is required to assure the aircrew has full control surface authority associated with the full cockpit control displacement. Each controller defines a cockpit control displacement which is limited by hard mechanical stops such as end stops of the yaw pedal controller 58 as described in the disclosed non-limiting embodiment. It should be understood that other controllers such as the cyclic controller 46 have similar mechanical limits. A flight control surface such as the anti-torque system 26 also defines a control surface authority which is mechanically limited. These mechanical limits may be defined by the maximum deflection of the flight control surface such as a pitch capability of the anti-torque system 26.

In the fully augmented mode, the trim integrator command is always added to the feed-forward command, but when in the direct mode, the trim integrator command will be fixed to a residual non-zero value because the actual trim (equilibrium) point of the aircraft varies with airspeed, gross weight, etc. This results in an apparent bias to the cockpit control displacement. There is no way to "fade out" or otherwise remove this residual trim command, since without the trim integrator command the aircraft will not be "in trim" and the aircrew would then have to hold force against the controller in the Direct Mode. This illustrates the need to trim the controller without trim follow-up in certain aircraft axes such as the aircraft yaw axis as discussed herein.

Figure 4:
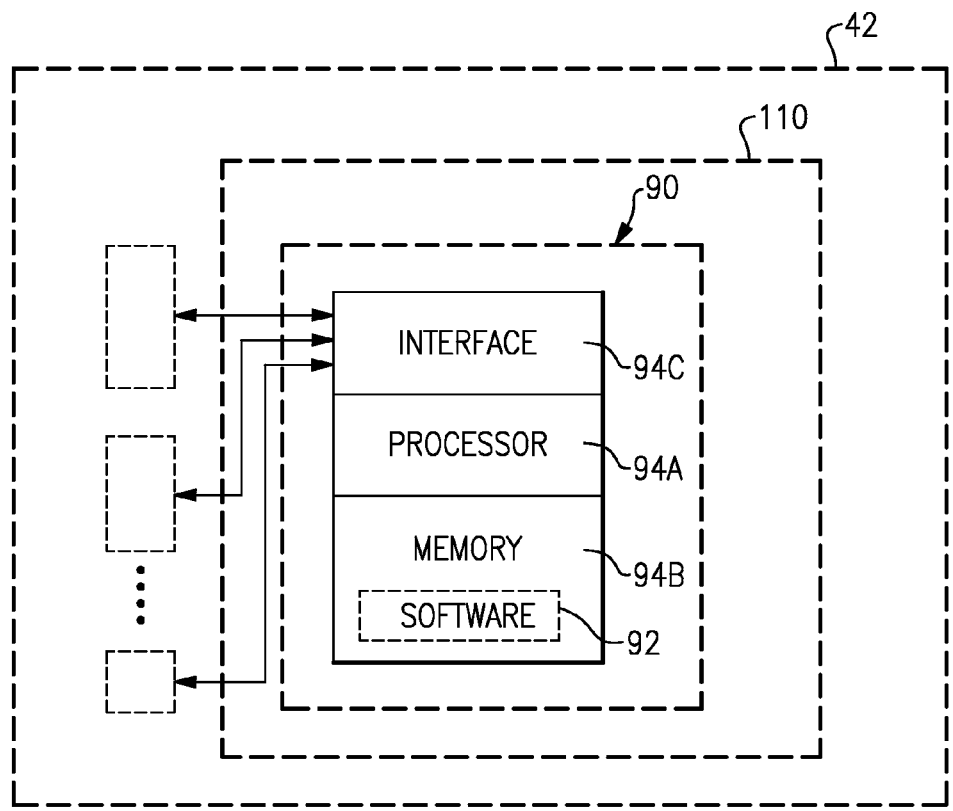
FIG. 4 is a schematic diagram of a module operable to executes an auto-trim logic.

Referring to FIG. 4, a module 90, such as that which defines the FCC 38, may be utilized to execute the auto-trim logic 92. The functions of the auto-trim logic 92 are disclosed in terms of logic diagrams, and it should be understood by those skilled in the art with the benefit of this disclosure that these functions may be enacted in either dedicated hardware circuitry or programmed software routines capable of execution in a microprocessor based electronics control embodiment. In the disclosed non-limiting embodiment, the auto-trim logic 92 is a portion of the integrator mode logic module 110 in the PFCS 42. The non-limiting embodiment disclosed herein is applied to the yaw pedal controller 58 but could also be applied to any control axis.

The module 90 may include a processor 94A, a memory 94B, and an interface 94C. The processor 94A may be any type of known microprocessor having desired performance characteristics. The memory 94B may, for example only, includes UVPROM, EEPROM, FLASH, RAM, ROM, DVD, CD, a hard drive, or other computer readable medium which stores the data and control logic described herein. The interface 94C facilitates communication with other logic modules, as well as other avionics and systems.

Figure 5:
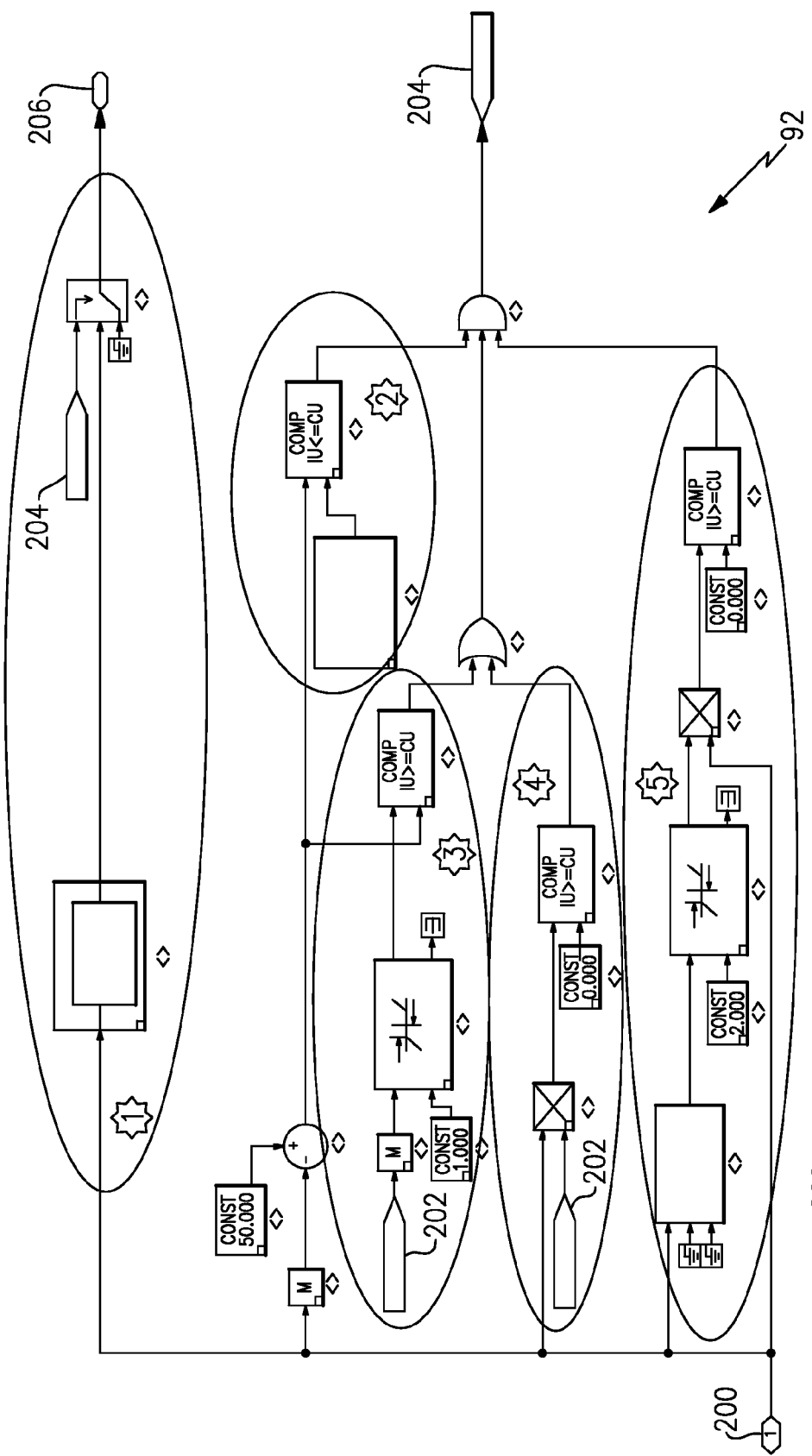
FIG. 5 is a logic diagram of the auto-trim logic.

Referring to FIG. 5, the auto-trim logic 92 is schematically illustrated as a logic diagram. The auto-trim logic 92 provides full pedal authority with the feel of a displacement system. The feel of a displacement system essentially permits a direct relationship between aircrew input to the yaw pedal controller 58 and the pitch output of the anti-torque system 26. Such a displacement feel provides an intuitive output for the aircrew, e.g., more input to the yaw pedal controller 58 results in more output from the anti-torque system 26.

In the fully augmented flight mode, the trim integrator command is always added to the feed-forward command. In the direct mode, so long as the remaining pedal authority, i.e., the remaining portion of available displacement to the yaw pedal end stops, is greater than the remaining portion of tail rotor servo authority such that it is possible to command full tail rotor displacement with the remaining pedal authority, the auto-trim logic 92 will provide a displacement pedal feel. That is, movement of the yaw pedal controller 58 is directly related to the anti-torque system 26.

When available pedal authority, however, is less than the remaining tail rotor authority, the auto-trim logic 92 actuates the trim integrator to re-reference the "center" of the yaw pedal controller 58 so as to allow the remaining portion of the cockpit control displacement, such as the yaw pedal controller 58, to equate to the remaining portion of the control surface authority such as the anti-torque system 26.

The auto-trim logic 92 disclosed in this non-limiting embodiment, generally includes five paths with two inputs, a total pedal command 208 and a remaining tail rotor control authority 202. The auto-trim logic 92 provides two outputs, an auto-trim enable 204 and an actual trim command value 206. Path #1 computes the actual trim command value once the auto-trim logic 92 is enabled. Path #2 compares total pedal command 200 to the auto-trim trigger value, 20% from total travel in this example, and, if total pedal command 200 is greater than the auto-trim trigger value, given that the other paths are also true, enables path #1. Path #3 compares remaining tail rotor control authority 202 and control authority remaining on the pedals, and if remaining tail rotor control authority is greater, enables path #1 given that paths #2 and #5 are also enabled. Path #4 checks if the pedal command and the remaining tail rotor control authority 202 are at different ends of the possible travel and, if so, enables path #1 given that paths #2 and #5 are also enabled. Path #5 checks that pedal velocity is in the same direction as the pedal command to, for example, assure the pilot is not reversing the command.

In operation then, the auto-trim logic 92 operates during the direct mode to monitor a remaining portion of a cockpit control displacement such as the yaw pedal controller 58 and an actual remaining portion of a control surface authority such as the pitch range of the anti-torque system. If the remaining portion of the cockpit control displacement is less than actual remaining portion of said control surface authority, the auto-trim logic 92 enables a feed forward to the trim integrator for related cockpit control.

As soon as the remaining portion of the cockpit control displacement equals to the remaining portion of said control surface authority, the feed forward is disabled. This provides an aircrew with full control over the entire control surface authority range, without the heretofore necessity of always introducing trim follow-up. The auto-trim logic 92 thereby facilities use of unique-trim controllers as displacement controllers without constant trim follow-up so as to improve handling qualities in degraded Fly-By-Wire flight control modes of operation.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A flight control system comprising:
    a controller which defines a controller displacement;
    a control surface which defines a control surface authority;
    a module providing a displacement feel to said controller in response to a remaining portion of said controller displacement being greater than a remaining portion of said control surface authority and said module operable to re-reference a center of said controller displacement to equate said remaining portion of said controller displacement with said remaining portion of said control surface authority in response to said remaining portion of said controller displacement being less than said remaining portion of said control surface authority.

2. The system as recited in claim 1, wherein said controller includes a yaw pedal system.

3. The system as recited in claim 2, wherein said displacement is defined by a yaw pedal end stop.

4. The system as recited in claim 2, wherein said control surface is a tail rotor system.

5. The system as recited in claim 4, wherein said displacement feel directly relates movement of said yaw pedal system to movement of said tail rotor system.

6. The system as recited in claim 1, wherein said auto-trim logic is operable to actuate a trim integrator to re-reference said center of said controller.

7. The system as recited in claim 1, wherein said remaining controller displacement is related to a remaining distance to a yaw pedal end stop of a yaw pedal system.

8. The system as recited in claim 7, wherein said remaining control surface displacement is related to a remaining servo authority of a tail rotor system.

9. The system as recited in claim 1, wherein said module provides a unique-trim control as modified by said auto-trim logic.

10. The system as recited in claim 1, wherein said module is operable only in a direct mode.

11. The system as recited in claim 1, wherein said module is operable only when the aircraft is on the ground.

12. The system as recited in claim 1, wherein said controller is located within an aircraft cockpit.

13. A method of flight control comprising:
providing a displacement feel to a controller in response to a remaining portion of a controller displacement being greater than a remaining portion of the control surface authority; and
re-referencing a center of the controller displacement to equate the remaining portion of the controller displacement with the remaining portion of the control surface authority in response to the remaining portion of the controller displacement being less than the remaining portion of the control surface authority.

14. A method as recited in claim 13, further comprising enabling controller feed forward to a trim integrator in response to the remaining portion of the controller displacement is less than the remaining portion of the control surface authority.

15. A method as recited in claim 13, disabling the feed forward in response to the remaining portion of the controller displacement is equal to the remaining portion of the control surface authority.

16. A method as recited in claim 13, wherein the providing the displacement feel to the controller and the re-referencing the center of the controller displacement only occurs when the flight control system is in a direct mode.

17. A method as recited in claim 13, wherein the providing the displacement feel to the controller and the re-referencing the center of the controller displacement only occurs when the aircraft is on the ground.

* * * * *